United States Patent [19]

Galvagni

[11] 4,085,435
[45] Apr. 18, 1978

[54] TANTALUM CHIP CAPACITOR

[75] Inventor: John L. Galvagni, Little Genesee, N.Y.

[73] Assignee: AVX Corporation, Great Neck, N.Y.

[21] Appl. No.: 695,596

[22] Filed: Jun. 14, 1976

[51] Int. Cl.² .............................................. H01G 9/00
[52] U.S. Cl. ................................. 361/433; 174/52 PE
[58] Field of Search .................. 317/230, 242; 29/570; 361/433, 306; 174/52 PE; 357/74

[56] References Cited

U.S. PATENT DOCUMENTS

| 3,081,374 | 3/1963 | Burch | 174/52 PE |
| 3,566,003 | 2/1971 | Wislocky | 357/74 X |
| 3,795,844 | 3/1974 | Markarian | 361/433 |
| 3,828,227 | 8/1974 | Millard et al. | 361/433 |

FOREIGN PATENT DOCUMENTS 2,230,629  1/1974  Germany .............................. 317/230

Primary Examiner—Stanley D. Miller, Jr.
Assistant Examiner—James W. Davie
Attorney, Agent, or Firm—Arthur B. Colvin

[57] ABSTRACT

The present invention is directed to a tantalum chip capacitor. The invention is characterized by encapsulating an essentially conventional tantalum capacitor subassembly including a body portion, the outer surface of which comprises a cathode, an anode, and an anode lead extending therefrom, within a metallic tubular case, preferably rectangular in transverse section. The subassembly is inserted within the casing and electrical connection is effected between the cathode and the case adjacent one end. An electrical connection is effected between the anode and the other end of the case. The case is thereafter filled with a polymeric insulating material in liquid form, which is thereafter caused to harden. After the polymeric material has hardened, a band, section or groove of the case is cut away to interrupt a direct current path between the ends of the case, which function as the terminals of the capacitor, the ends being maintained in structural integrity by the hardened polymeric material.

2 Claims, 6 Drawing Figures

TANTALUM CHIP CAPACITOR

BACKGROUND OF THE INVENTION

1. Field of the Invention

The present invention is in the field of capacitors, and more particularly relates to an improved tantalum chip capacitor.

2. The Prior Art

Tantalum chip capacitors, also known as solid electrolytic capacitors, have recently come into widespread use, especially in so-called thick film circuitry applications. Tantalum chip capacitors have the known advantage of providing a relatively high capacitance per given volume. By way of example, capacitor devices of the type described and related types of capacitors are shown in U.S. Pat. Nos. 3,855,505; 3,349,294; 3,341,752; 3,356,911; 3,308,350; and 3,337,428. Such capacitors are known to be fragile, non-uniform in outside dimension, and have high susceptibility to moisture penetration.

SUMMARY OF THE INVENTION

The present invention may be summarized as directed to an improved capcitor, and particularly an improved capacitor of the tantalum chip type and method of making the same.

Broadly stated, the invention is directed to a means for encapsulating and forming output terminals on tantalum chip capacitors, the product of a method involving inserting into a tubular metal case which is preferably rectangular in transverse section, a tantalum capacitor subassembly, the subassembly including a body portion, the outer surface of which defines the cathode, an anode and an anode lead. A first electrical connection is effected between the cathode and the case adjacent a first end of the case through the use or solder or conductive epoxy. A second connection is effected by welding, etc. between the anode lead and the case adjacent a second end of the case. The voids within the case are thereafter filled, preferably through the second end, with an insulating liquid polymeric material which, through cooling or polymerization, etc. thereafter hardens.

The final step of manufacture includes removing a continuous band of the casing at an area in registry with the hardened polymeric material, whereby direct current flow through the case between the ends thereof is interrupted, the polymeric material nonetheless bonding the case halves together to form a durable, rugged and relatively moisture impervious capacitor device, the terminals of which are defined by the portions of the case to either side of the groove, band or gap.

It is accordingly an object of the invention to provide a tantalum chip capacitor.

A further object of the invention is to provide a capacitor of the type described which is highly resistant to ingress of moisture and which is sufficiently rugged to permit manual or automatic handling without special precautions, in contrast to conventional capacitors of this type which require the use of vacuum handling apparatus, cushioned tweezers or the like.

Still a further object of the invention is the provision of an improved capacitor device.

To attain these objects and such further objects as may appear herein or be hereinafter pointed out, reference is made to the accompanying drawings, forming a part hereof, in which.

Figure 1:
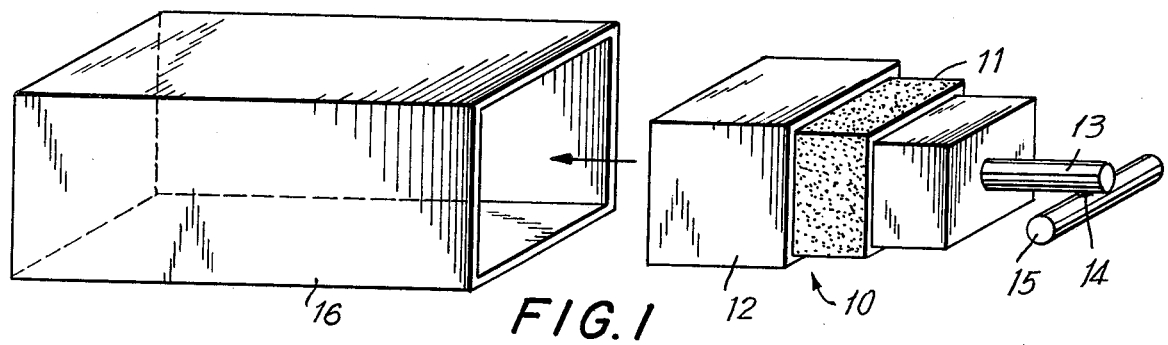
FIG. 1 is an isometric preassembly view of the components of the capacitor.

Referring now to the drawings, there is shown at 10 a tantalum chip capacitor subassembly, the manufacturing steps of which are known in the art, being described briefly hereinbelow for illustrative purposes only, since the principal advance of the present invention resides in the method of terminating and encapsulating the subject known capacitor.

The capacitor subassembly 10 is comprised of a tantalum powder pressed into a pellet, into which a lead is embedded. The pellet is heated to temperatures of about 2000° C under high vacuum conditions to produce a sponge-like tantalum anode. A dielectric surface is formed on the tantalum, the surface being composed of tantalum pentoxide formed in situ by electrolytically anodizing the spongy tantalum pellet in a bath of phosphoric acid. The part is cleaned and dried, and thereafter impregnated in Manganous nitrate, the pellet being thereafter heated to about 300° C, converting the nitrate to Manganous dioxide.

This pyrolysis step is repeated a number of times with intermittent electrolytic reformations, to heal the dielectric which is damaged by the repeated temperature excursions.

After this procedure is completed, the part is washed and dried and a layer 11 of graphite applied as an aqueous suspension. After drying, the graphite is coated with a conductive layer, such as a silver paint or copper layer 12, it being appreciated that the layer 12 forms the cathode connection or terminal to the subassembly 10, and the lead 13 defines the anode connection.

As the specific procedure in the formation of the subassembly 10 is fully expounded in one or more of the above referenced patents, further description is omitted.

As noted above, the principal contribution of the instant invention resides in terminating (providing output terminals for) and encapsulating the capacitor device. Such method and the resultant capacitor are illustrated in FIGS. 1 to 6.

The anode lead 13 may be welded as at 14 to a tantalum, nickel or Kovar cross bar 15, which will in a subsequent step be electrically connected to define the anode terminal of the capacitor, it being understood that a direct connection between the riser or lead 13 may be optionally effected. The use of a tantalum, nickel or Kovar cross bar is optional but preferred, due to their compatible welding characteristics.

The subassembly 10, with the bar 15 attached, is thereafter inserted into a metallic case 16 which is preferably formed of extruded metal, such as, by way of preferred example, KOVAR (the trademark of Westinghouse Electric Corporation for a high electrical conductivity, relatively low thermal expansion material).

Figure 2:
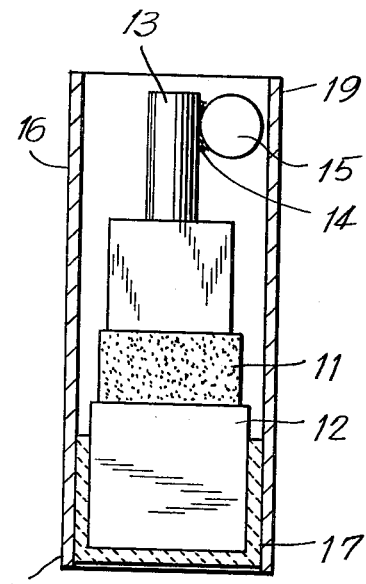
FIGS. 2, 3 and 4 are vertical sectional views through the capacitor components diagrammatically illustrating progressive stages of manufacture thereof.

With the insert 10 positioned within the case 16, as shown in FIG. 2, the case is placed in an upright position, with the anode or silver coating 12 uppermost, and a layer 17 of solder or conductive epoxy is flowed into the area between the coating 12 and lower end 18 of the case, providing the cathode connection of the capacitor. The quantity of solder or conductive epoxy 17 is preferably sufficient to fill the interstices between the case and the subassembly, providing a tight seal adjacent the end 18.

As the next step, the cross bar 15 is electrically connected to the case 16 adjacent the upper end 19 thereof, effecting the anode connection. Such electrical connection, by way of example, is effected by a capacitive discharge welding device 20, one electrode 21 of which is grounded to the case, the other electrode 22 of which is connected to the "hot" side of the weld current output.

It will be understood that the edge portion 23 of the cross bar 15 is sandwiched against the side of the casing by pressure exerted between the electrodes 21 and 22, and, upon passage of a welding current, is fused to the case.

Figure 3:
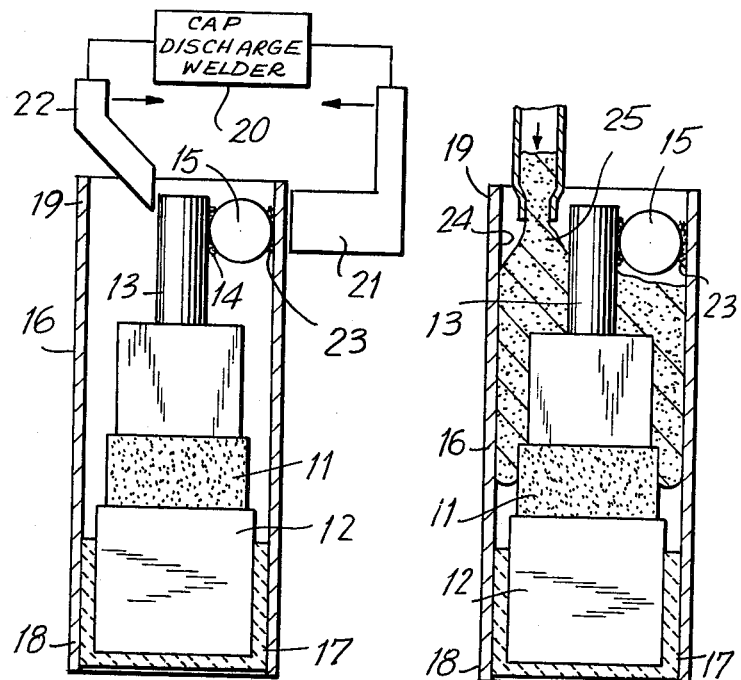

Alternative means to that shown in FIG. 3 for effecting an electrical connection between the lead 13 and case adjacent the end 19 may be employed. However, an advantage of the utilization of the tantalum bar and Kovar case is that, due to the coordinated coefficients of thermal expansion of the two metallic components, the likelihood of separation of the parts when the capacitor is subsequently heated in the course of incorporation into an electronic circuit is substantially reduced.

Figure 4:
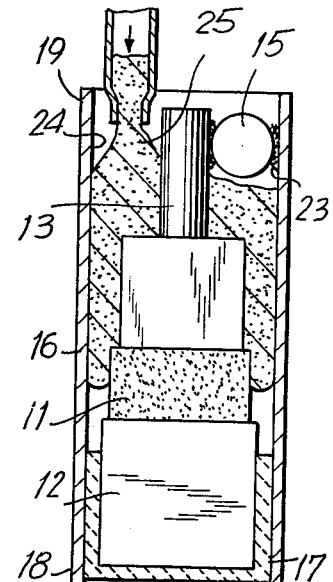

In accordance with the illustration of FIG. 4, the next step in the manufacture of the device involves introducing into the voids between the inner walls 24 and the capacitator subassembly 10 a polymeric insulating material 25. The material 25 must, of course, have high electrical insulation properties, is preferably shrink-resistant in the course of hardening or polymerizing, and preferably forms a strong adhesive bond with the engaged interior surfaces 24 of the case and external surfaces of the subassembly 10.

A preferred material is an epoxy mixture such as an epoxy potting compound, it being understood that any of a variety of thermosetting or thermoplastic resinous materials having the above recited properties may be suitably employed.

Preferably, the epoxy or like liquid resinous material may be added in an vacuum environment, whereby improved sealing properties and evacuation of voids are accomplished.

It will be recognized that, as presently constituted, the capacitor elements are shunted by the metal case 16.

Figure 5:
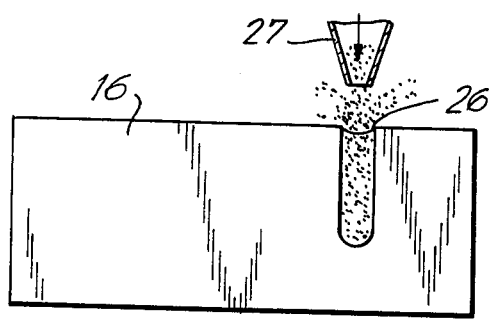
FIG. 5 is a side elevational view diagrammatically illustrating a further operation in the manufacture of the device.

After hardening of the resinous materials, the next step, illustrated in FIG. 5, involves cutting or etching a groove or gap 26 completely about the case, whereby current flow between the ends 18 and 19 of the case is precluded. While the formation of such gap 26 may be effected in any of a plurality of ways, such as by grinding, broaching, etc., it is preferred to form the groove by the use of a sandblasting technique, known per se.

As diagrammatically shown in FIG. 5, a fine nozzle carries a stream of abrasive particles, such as sand entrained in a high speed air blast, against an increment of the side portion of the case, a relative movement between the case 16 and the nozzle 27 being effected, whereby the metallic material is completely removed about a zone or area circling the case. The use of sandblasting techniques is preferred since it has been discovered that the resulting cutting action is preferential as respects the metal, and will cut into the epoxy material at a slower rate.

Figure 6:
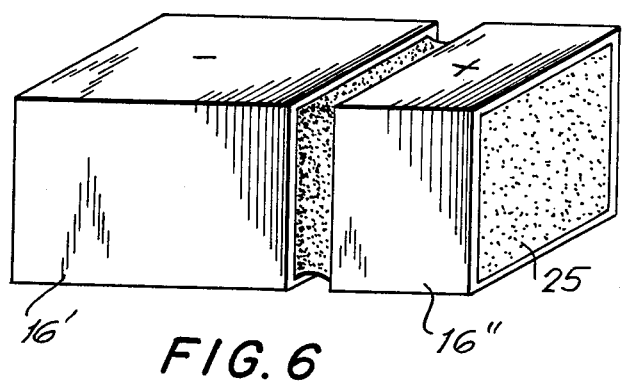
FIG. 6 is a perspective view of a finished capacitor in accordance with the invention.

The capacitor resulting from the manufacturing steps hereinabove described is shown in FIG. 6.

It will be understood that the case 16 has now been divided into two separate parts, 16' defining the cathode terminal and 16" defining the anode terminal of the capacitor. The hardened epoxy material 25 mechanically bonds together the two components of the case, at the same time tightly sealing the case and assuring that the capacitor will not be harmed in the course of handling. Electrical connections may be made to any portion of the terminals 16', 16".

While the capacitor has been illustrated as having been ecapsulated within a rectangular (in this instance, a square) tubular metal member preferably comprising a secion cut from an extended extruded length, it will be readily recognized that other cross sectional shapes may be suitably employed. The rectangular shape has the advantage, however, of permitting mounting of the device on a flat surface.

From the foregoing description it will be understood that there has been described and illustrated an improved method of making a capacitor, and particularly a tantalum chip capacitor. A principal advance inhering in the method of the present invention is considered to reside in the concept of disposing a capacitor subassembly within an integral conductive sleeve, effecting connections between the electrodes of the subassembly and sleeve at spaced positions, introducing into the interior of the case or sleeve a polymeric dielectric material which is permitted or caused to harden, and electrically isolating end portions of the sleeve, thereby to define the terminals of the capacitor, while assuring co-planar alignment of the respective surfaces. Such alignment facilitates connection of the terminals to spaced conductor portions, e.g. on a flat circuit board.

The term "electrical isolation" as used herein and in the claims is intended to refer to the interruption of the direct conductive relationship through the casing without regard to the capacitive connection between the terminals, which is obviously the result of the process as described.

It will be further recognized that variations in the steps, manner of executing the same, and sequence in which they are carried out will occur to those skilled in the art who have been familiarized with the instant disclosures. For instance, two or more capacitors may be disposed in a single metal case and electrically isolated by the formation of two or more circumferential peripheral gaps. Likewise, an internal connection may be effected between the cathodes, for instance, of the capacitors, the common terminal being the central band isolated from the ends (anode terminals) by peripheral gaps.

Further, while the present invention has been described as encapsulating a tantalum capacitor, it will be appreciated that the encapsulating concept may be used with other capacitive devices, particularly of the film forming material type.

Accordingly, the invention hereof is to be broadly construed within the scope of the appended claims.

Having thus described the invention and illustrated its use, what is claimed as new and is desired to be secured by Letters Patent is:

1. A capacitor device comprising, in combination, a solid electrolyte chip capacitor subassembly having an outer cathode end portion, an anode body projecting axially from the cathode end portion, and an anode lead extending axially from said anode body, a tubular metallic case formed by axially spaced sleeve members completely enclosing said cathode end portion and anode body of the subassembly, a first electrical connection between said cathode end portion of said subassembly and one of the sleeve members of said case adjacent one axial end of the subassembly, a second electrical connection completely enclosed by said case between said anode lead and the other sleeve member of said case adjacent the other axial end of the subassembly, a unitary mass of hardened polymeric insulating material encapsulating the subassembly and adhesively bonded internally to said case extending over a central zone between said axial ends, said sleeve members being axially spaced along the anode lead to form a continuous peripheral gap, which is substantially smaller in axial extent than said case and through which the insulating material in the central zone is restrictively exposed, whereby said case on either side of said gap define peripherally continuous terminals for said capacitor subassembly and a protective enclosure for the insulating material.

2. A capacitor device in accordance with claim 1 wherein said case number is rectangular in transverse section.

* * * * *